United States Patent
Byun et al.

(10) Patent No.: US 7,355,333 B2
(45) Date of Patent: Apr. 8, 2008

(54) FLAT-TYPE FLUORESCENT LAMP, LIQUID CRYSTAL DISPLAY HAVING THE SAME, AND METHOD THEREOF

(75) Inventors: Jin-Seob Byun, Seoul (KR); Sang-Yu Lee, Yongin-si (KR); In-Sun Hwang, Suwon-si (KR); Hae-Il Park, Seoul (KR); Hyoung-Joo Kim, Uiwang-si (KR); Joong-Hyun Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 3 days.

(21) Appl. No.: 11/335,033

(22) Filed: Jan. 18, 2006

(65) Prior Publication Data

US 2006/0158117 A1    Jul. 20, 2006

(30) Foreign Application Priority Data

Jan. 18, 2005    (KR) .................. 10-2005-0004674

(51) Int. Cl.
*H01J 1/62* (2006.01)
*H01J 63/04* (2006.01)

(52) U.S. Cl. ................. 313/493; 313/582; 313/607

(58) Field of Classification Search .......... 313/607, 313/484–485, 495, 582, 493; 445/24–27
See application file for complete search history.

(56) References Cited

U.S. PATENT DOCUMENTS

| | | | | |
|---|---|---|---|---|
| 5,233,262 A * | 8/1993 | Lynn et al. | ................. | 313/113 |
| 5,461,279 A * | 10/1995 | Hasegawa | .................. | 313/493 |
| 5,509,841 A * | 4/1996 | Winsor | ........................ | 445/26 |
| 5,850,122 A * | 12/1998 | Winsor | ........................ | 313/493 |
| 6,294,867 B1 * | 9/2001 | Lynn | ........................... | 313/422 |
| 7,102,290 B2 * | 9/2006 | Miyaji et al. | ................. | 313/607 |
| 2005/0007019 A1 * | 1/2005 | Kim et al. | .................. | 313/607 |
| 2005/0116607 A1 * | 6/2005 | Park et al. | ................... | 313/485 |
| 2006/0043869 A1 * | 3/2006 | Yoon | .......................... | 313/491 |
| 2006/0103313 A1 * | 5/2006 | Park et al. | .................. | 313/607 |
| 2006/0255737 A1 * | 11/2006 | Aizawa | ...................... | 313/634 |

* cited by examiner

*Primary Examiner*—Nimeshkumar D. Patel
*Assistant Examiner*—Kevin Quarterman
(74) *Attorney, Agent, or Firm*—Cantor Colburn LLP

(57) ABSTRACT

A flat-type fluorescent lamp and liquid crystal display having minimum pin-shaped holes include a first substrate, a second substrate forming a plurality of discharging spaces together with the first substrate, and external electrodes that cover the outer edge surfaces of the first and the second substrates while perpendicularly extending across the discharging spaces. The second substrate is substantially as thick as the first substrate, especially at the position covered by the external electrodes.

24 Claims, 6 Drawing Sheets

FLAT-TYPE FLUORESCENT LAMP, LIQUID CRYSTAL DISPLAY HAVING THE SAME, AND METHOD THEREOF

This application claims priority to Korean Patent Application No. 2005-4674, filed on Jan. 18, 2005 and all the benefits accruing therefrom under 35 USC § 119, and the contents of which in its entirety are herein incorporated by reference.

BACKGROUND OF THE INVENTION

1. Field of the Invention

The present invention relates to a flat-type fluorescent lamp and a liquid crystal display ("LCD") and, more particularly, to a flat-type fluorescent lamp minimizing pin-holes therein and an LCD having the flat-type fluorescent lamp.

2. Description of the Related Art

A liquid crystal display ("LCD") displays images by passing light through liquid crystal molecules that have optical birefringence characteristics. The LCD is lighter, thinner, and more power-effective than other display devices such as a cathode ray tube ("CRT") and a plasma display panel ("PDP").

Because the LCD is not a self-emissive display, the LCD needs a light source at the rear side of the LCD. Conventionally, as a light source, the narrow and thin cold cathode fluorescent lamp ("CCFL") has been used. However, the number of CCFLs per LCD increases as the size of the LCD increases, thereby heightening manufacturing cost and luminance irregularity.

To lower the manufacturing cost and enhance luminance uniformity, the flat-type fluorescent lamp, which emits light from a wider surface than the conventional CCFL, has been suggested. The flat-type fluorescent lamp includes a lamp body having a number of separate discharging spaces and a pair of external electrodes providing electricity to the discharging spaces of the lamp body. The lamp body has a pair of glass substrates, at least one of which is structured so as to form the discharging spaces. The lamp body also includes a fluorescent layer within the discharging spaces for radiating light.

By supplying electricity to the external electrodes from a power source such as an inverter, plasma and ultra violet rays are sequentially generated in each of the discharging spaces, thereafter, visible rays are radiated as the ultra violet rays pass through the fluorescent layer.

In supplying electricity, if either an excessive voltage greater than an insulation destructing voltage or an excessive current greater than a critical current is supplied to the external electrodes, the lamp body could be damaged at a location covered by the external electrodes. Even worse, the Joule heat may melt the lamp body and produce pin-holes on the external electrodes or the glass substrate. Afterwards, through the pin-holes, plasma gas, such as neon Ne, helium He, argon Ar, or mercury Hg gas, in the discharging spaces could leak out to an exterior of the lamp body. Also, outer gas may flow into the discharging spaces through the pin-holes. As a result, the flat-type fluorescent lamp is driven abnormally causing irregular radiation or even radiation failure.

Accordingly, there has been a need for a flat-type fluorescent lamp and LCD to be driven normally and stably by minimizing the pin-holes.

BRIEF SUMMARY OF THE INVENTION

In accordance with exemplary embodiments of the present invention, a flat-type fluorescent lamp includes a first substrate having a first thickness and a second substrate having a second thickness. The second substrate and the first substrate combine to form a discharging space, in which a plasma gas is filled. The lamp also includes a pair of external electrodes disposed at end portions of the first substrate and the second substrate. At the area where the external electrodes are disposed, the first thickness is substantially the same as the second thickness. The lamp further includes a splitting portion that divides the discharging space by contacting the first substrate.

Typically, the first thickness and the second thickness are no less than 0.7 mm and no more than 1.1 mm. The second thickness where the external electrodes are disposed can be substantially different from a thickness where the discharging space is formed. The second thickness where the discharging space is formed can be substantially different from a thickness at the splitting portion.

The first substrate includes a first fluorescent layer facing the second substrate, and the second substrate includes a second fluorescent layer facing the first substrate. The thickness of the first fluorescent layer contributes to the first thickness, and the thickness of the second fluorescent layer contributes to the second thickness. A reflection layer is formed under at least one of the first fluorescent layer and the second fluorescent layer. The thickness of the reflection layer contributes to the thickness of the first substrate or the second substrate where the reflection layer is formed.

In accordance with other exemplary embodiments of the present invention, a liquid crystal display includes the lamp described above, a liquid crystal panel, and an inverter connected to the external electrodes of the lamp so as to supply discharge electricity to the lamp.

In accordance with other exemplary embodiments of the present invention, a method of minimizing pin-holes in a lamp body of a flat-type fluorescent lamp from occurring upon application of a voltage supplied to external electrodes on the lamp body, includes providing a first substrate having a first thickness in an area where external electrodes are to be disposed, providing a second substrate having a second thickness in an area where external electrodes are to be disposed, and selecting the first thickness to be substantially same as the second thickness.

By providing the first thickness and second thickness of the first and second substrates to be substantially the same, an occurrence of pin-holes in the first and second substrates is minimized because a discharging current applied from the inverter to the external electrodes is evenly distributed to the first and second substrates.

DETAILED DESCRIPTION OF THE INVENTION

Figure 1:
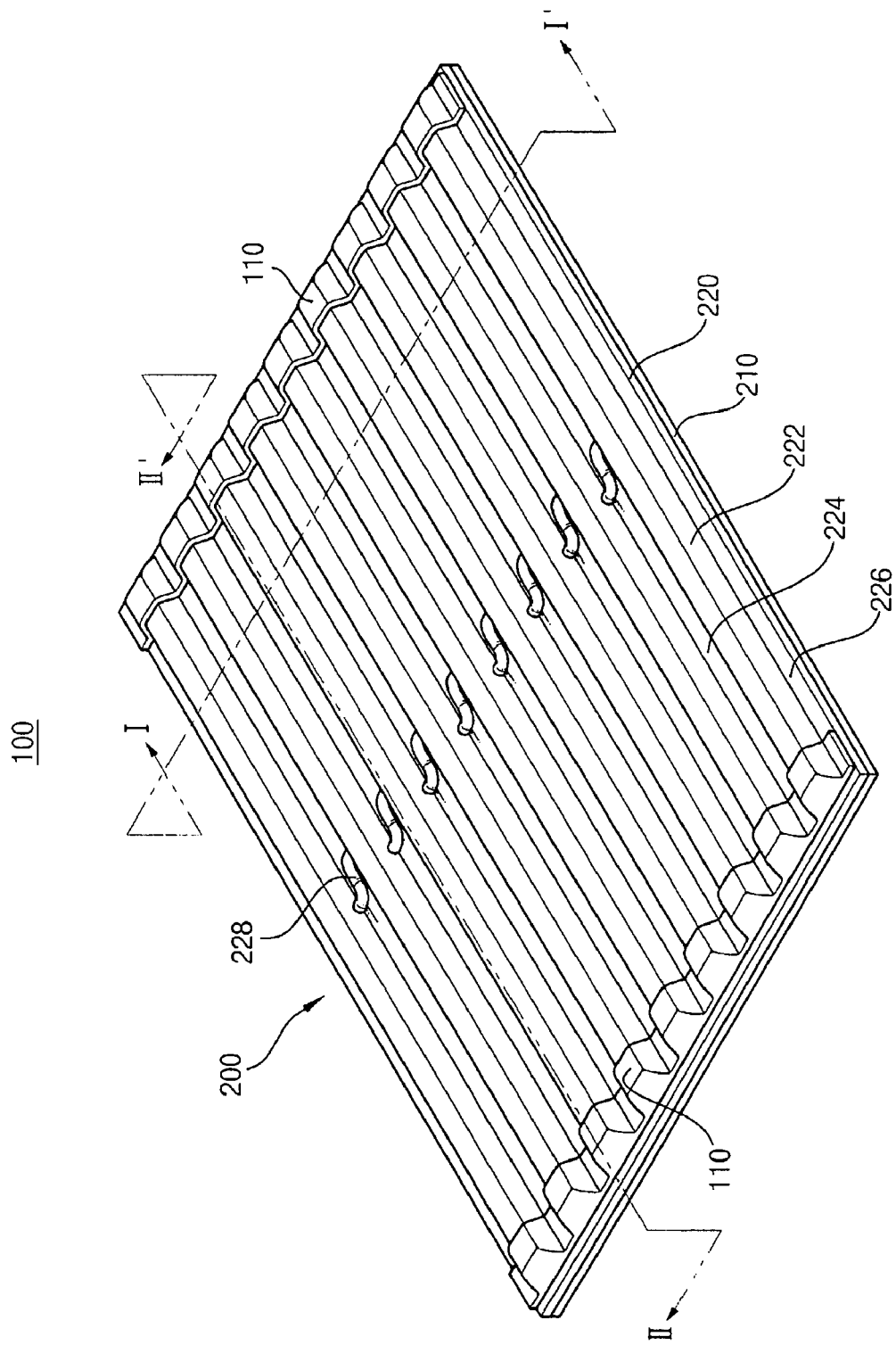
FIG. 1 is a perspective view of an exemplary embodiment of a flat-type fluorescent lamp in accordance with the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
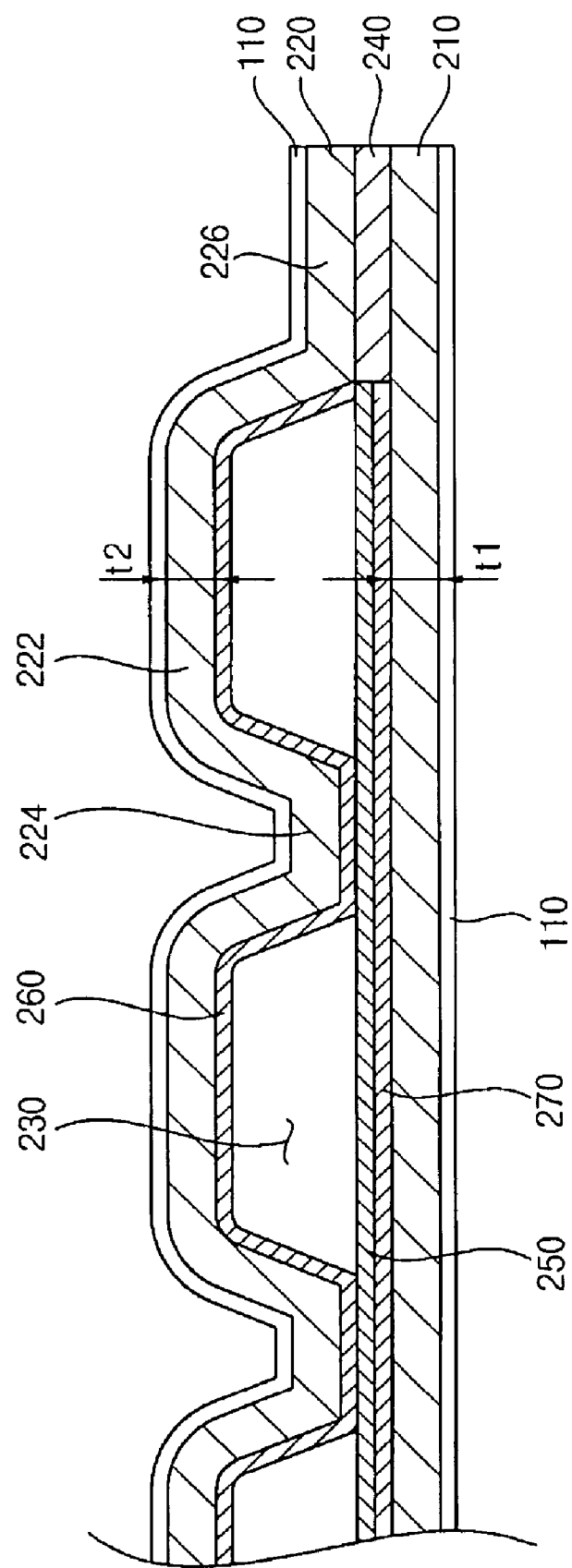
FIG. 2 is a partial cross-sectional view along line I-I' of FIG. 1.
Figure 3:
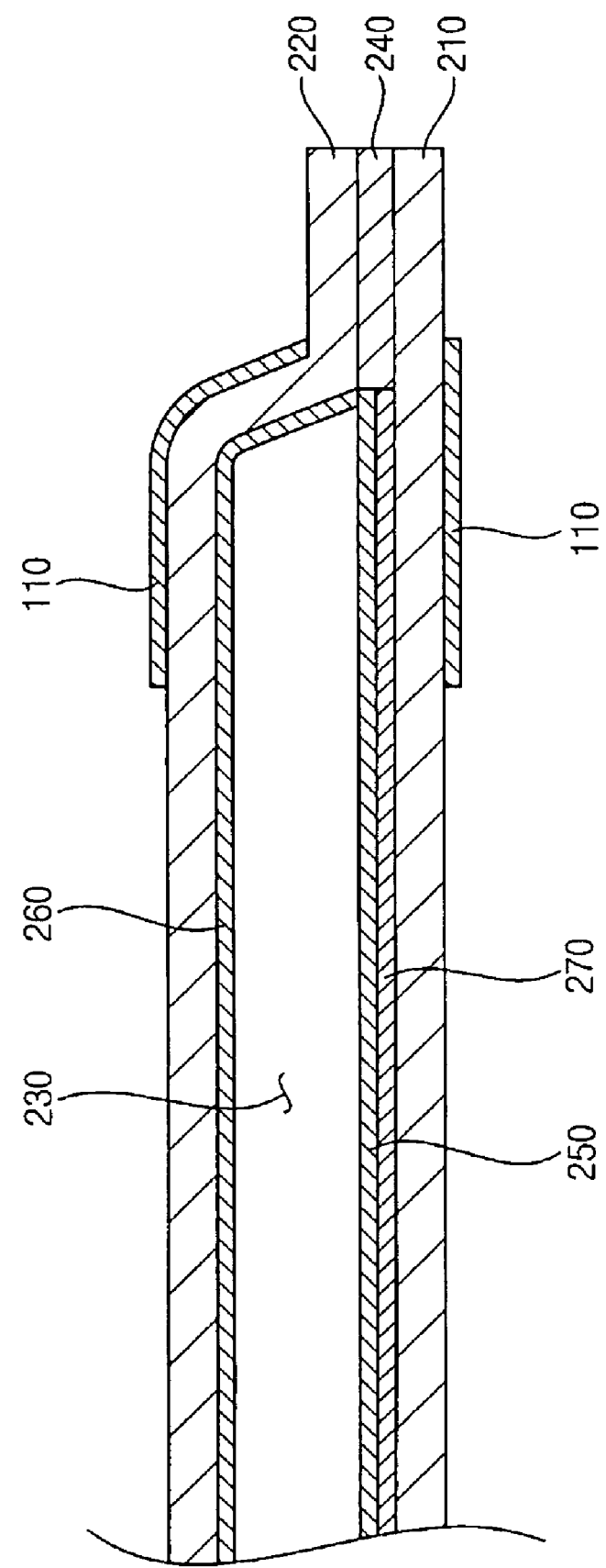
FIG. 3 is a partial cross-sectional view along line II-II' of FIG. 1.

FIG. 1 is a perspective view of an exemplary embodiment of a flat-type fluorescent lamp 100 in accordance with the present invention. FIGS. 2 and 3 are cross-sectional views taken along lines I-I' and II-II' of FIG. 1, respectively.

Referring to FIGS. 1, 2 and 3, flat-type fluorescent lamp 100 includes a lamp body 200 and a pair of external electrodes 110. The lamp body 200 may be generally rectangular shaped with first, second, third, and fourth sides. The first and third sides may be substantially parallel to each other, and may be substantially perpendicular to the second and fourth sides of the lamp body 200. The pair of external electrodes 110 may extend in a lengthwise direction adjacent to the first and third sides of the lamp body 200. Lamp body 200 includes a first substrate 210 and a second substrate 220, which combine to form discharging spaces 230. First substrate 210 and second substrate 220 have substantially the same thickness, as will be further described below.

External electrodes 110 are disposed at both edges of lamp body 200, such as at the first and third sides of the lamp body 200, so that the gas contained in discharging spaces 230 is discharged when external electrodes 110 are turned on. While the electrodes 110 are illustrated and described as externally disposed on an outer surface of the lamp body 200, one of the external electrodes 110 can instead be internalized. In the present embodiment, external electrodes 110 cross discharge spaces 230 by being disposed at the end portions of lamp body 200. More particularly, the external electrodes 110 extend in a direction that is substantially perpendicular to a longitudinal axis of each discharging space 230, thus the external electrodes 110 cross over each discharging space 230. External electrodes 110 are disposed at the outer surface of either first substrate 210 or second substrate 220, or at the outer surface of both first substrate 210 and second substrate 220.

When the gas is discharged, discharging spaces 230, separated from each other in lamp body 200, radiate light. Lamp body 200 typically has a rectangular shape when viewed from the top, and the discharging spaces 230 are filled with discharge gases such as He, Ne, Ar and/or Hg. When electricity is applied to each discharge space 230 through external electrodes 110, the gases in discharging spaces 230 are excited and produce ultra violet rays, which is later converted to visible rays by passing through a second fluorescent layer 260 on the inner side of discharging spaces 230 of the second substrate 220. For enhanced light efficiency and uniformity, the inner space of lamp body 200 is divided into a number of discharge spaces 230 so that lamp body 200 radiates light evenly from the surface of lamp body 200. The discharge spaces 230 are arranged in parallel to each other, and may each have a longitudinal axis substantially parallel to the second and fourth sides of the lamp body 200, and substantially perpendicular to the first and third sides of the lamp body 200.

First substrate 210 of lamp body 200 has a rectangular shape and is made of glass with a first thickness t1, and may be substantially plate shaped with planar inner and outer surfaces, where an inner surface faces the discharging spaces 230. First substrate 210 may have an ultra violet ray blocking material layer 270 on an inner surface thereof to prevent the ultra violet ray leakage from discharging spaces 230.

Second substrate 220 is made of a glass with a second thickness t2. Second substrate 220 is made of a transparent glass to transmit the visible rays. Second substrate 220 may also have an ultra violet ray blocking material layer (not shown), similar to ultra violet ray blocking material layer 270, to preclude the leakage of ultra violet rays from the second substrate 220.

According to the present embodiment, first substrate 210 and second substrate 220 have a similar thickness to each other to minimize pin holes. That is, thickness t1 and t2 are substantially the same thickness. If the thicknesses t1 and t2 were different thicknesses, then more current would flow to the thinner substrate and result in the formation of pin holes in the thinner substrate.

The pin-hole is a defect formed on first and/or second substrates 210 and 220. More specifically, the discharging current originated from an inverter (not shown) and applied to external electrodes 110, flows to and through first and second substrates 210 and 220. The amount of the current is proportional to the capacitances of first and second substrates 210 and 220 because the capacitances of first and second substrates 210 and 220 are inversely proportional to the thickness of first and second substrates 210 and 220. Thus, the current density is inversely proportional to the thickness of first and second substrates 210 and 220. Therefore, a substrate thickness difference would induce uneven current flows to first and second substrate 210 and 220. In particular, more current density would be provided on or in the thinner substrate. As the current density increases and reaches or exceeds a critical density value, the pin-holes are formed on or in either or both first and second substrates 210 and 220.

However, as suggested in this embodiment, with the similar thickness of first and second substrates 210 and 220, the discharging current evenly flows to each of substrates 210 and 220 and is not biased to any one of first and second substrates 210 and 220. Consequently, pin-hole formation in the first and second substrates 210 and 220 is minimized.

Second substrate 220 can be formed in various methods. For example, a flat glass plate may be heated and put into a mold having a desired configuration so as to be deformed according to the configuration.

During the shaping of second substrate 220, the thickness of second substrate 220 reduces from the original thickness of the pre-formed glass substrate, because the shaping process increases the surface area of the original glass substrate. Because first substrate thickness t1 of the first substrate 210 is substantially the same as second substrate thickness t2 of the second substrate 220, if a 1.1 mm thick glass plate is changed to a 0.7 mm thick second substrate 220, then a first substrate 210 having around 0.7 mm thickness is prepared.

Determination of the substrate thickness is important. If first and second substrates 210 and 220 are too thin, then lamp body 200 can be bent or even easily broken. However, if first and second substrates 210 and 220 are too thick, then lamp body 200 becomes heavy and bulky, thereby making the LCD less compact. Additionally, as the size of the LCD gets larger, the thickness gets more significant. Therefore, the typical thickness of first and second substrates 210 are 220 are in the range of about 0.7 mm~about 1.1 mm.

Second substrate 220 has a number of discharging space portions 222, a number of splitting portions 224, and a sealing portion 226. Discharging space portions 222 form discharging spaces 230 in combination with first substrate 210. Splitting portion 224 is disposed between neighboring discharging space portions 222 and separates neighboring discharging spaces 230 of lamp body 200 by contacting with first substrate 210. Sealing portion 226, which is disposed along the edge portions of second substrate 220, such as along a periphery of the second substrate 220, is attached to first substrate 210 through an adhesion layer 240. As shown in FIG. 2, discharge spaces 230 are repeatedly formed with a predetermined interval. The interval may be uniform as shown or alternatively the interval may be non-uniform. The curved shape of discharging space portions 222 can be an arch shape as shown in FIG. 2. Alternatively, the curved shape can be of various shapes such as, but not limited to, half-circle, rectangle, and trapezoid.

Second substrate 220 may also include a number of gas paths 228 for connecting neighboring discharging spaces 230 and allowing the gas flow between discharging spaces 230. Each splitting portion 224 of second substrate 220 has at least one gas path 228 formed therein. Gas path 228 is for discharging the gas from discharging spaces 230 in a gas exhaustion step, and for charging the gas into discharging spaces 230 in a gas injecting step, and for allowing the gas flow between discharging spaces 230 for even illumination of lamp body 200. Gas paths 228 can be in a variety of shapes, for example, gas paths 228 can each have an S shape because the S shape can prohibit unequal plasma distribution caused by the interference between neighboring discharging spaces 230.

First substrate 210 and second substrate 220 are attached to each other through adhesion layer 240 at sealing portion 226. In order to form adhesion layer 240, a frit that melts at a lower temperature than first and second substrates 210 and 220 melts is placed at the position corresponding to sealing portion 226 of lamp body 200. Then, the frit is melted so as to conjoin first and second substrates 210 and 220. Preferably, the conjoining temperature is about 400~600° C.

For a secure contact of splitting portion 224 to first substrate 210, a gas pressure difference between the inner spaces of lamp body 200 and an exterior of lamp body 200 is used. In particular, after combining first and second substrates 210 and 220 with the adhesion layer 240, discharging spaces 230 are exhausted so as to be in a vacuum state. Then, various plasma gases are injected into discharging spaces 230. The gas pressure inside discharging spaces 230 is about 50~70 torr which is smaller than the gas pressure exterior to the lamp body 200, which is about 760 torr. Thus, the difference of gas pressure presses first and second substrates 210 and 220 to each other. As a result, splitting portions 224 of second substrate 220 closely contacts first substrate 210. Thus the gases within the discharging spaces 230 do not communicate with each other except through the gas paths 228.

Lamp body 200 further includes a first and a second fluorescent layer 250 and 260 on the respective inner surfaces of first and second substrates 210 and 220. Fluorescent layers 250 and 260 radiate visible rays after being excited by ultra violet rays of the plasma gases. In comparison with the thickness of first or second substrates 210, 220, fluorescent layers 250 and 260 are extremely thin. A typical thickness of fluorescent layer 250 or 260 is less than 100 μm, for example, 40 μm. Fluorescent layers 250 and 260 are disposed on inner surfaces of both first and second substrates 210 and 220, and the current can be evenly distributed to the first substrate side and the second substrate side.

Lamp body 200 may include a reflection layer (not shown) between first substrate 210 and first fluorescent layer 250. The reflection layer cuts off the leakage of the visible rays that might be lost through first substrate 210. To enhance reflectivity and to avoid color shift, the reflection layer may be made of $AlO_x$ and/or $BaSO_4$. Typically, the thickness of the reflection layer is less than 100 μm, for example, 80 μm, which is significantly thinner than first thickness t1 of first substrate 210. When designing flat-type fluorescent lamp 100, therefore, the reflection layer's thickness can be added to the thickness of first substrate 210 so that a thickness t1 of first substrate 210 and thickness of reflection layer combined is substantially the same as thickness t2 of second substrate 220.

Fluorescent layers 250 and 260 and the reflection layer can be formed by spraying appropriate materials on the inner surfaces of first and second substrates 210 and 220.

Lamp body 200 may further include a protection layer (not shown) disposed between first substrate 210 and the reflection layer or between second substrate 220 and second fluorescent layer 260. The protection layer blocks the chemical reaction between first and second substrates 210 and 220 and Hg in discharging spaces 230, thereby minimizing Hg loss and preventing darkening phenomenon of lamp 100. Also, an electrical clip (not shown) may be used for providing an electrical connection between external electrodes 110 provided on upper and lower surfaces of lamp body 200.

External electrodes 110 can be coated with a silver paste, the mixture of Ag and $SiO_x$. Alternatively, a metal powder can be sprayed over external electrodes 110 to form a conductive coated layer. A protective layer (not shown) may cover external electrodes 110 for protection purposes.

Figure 4:
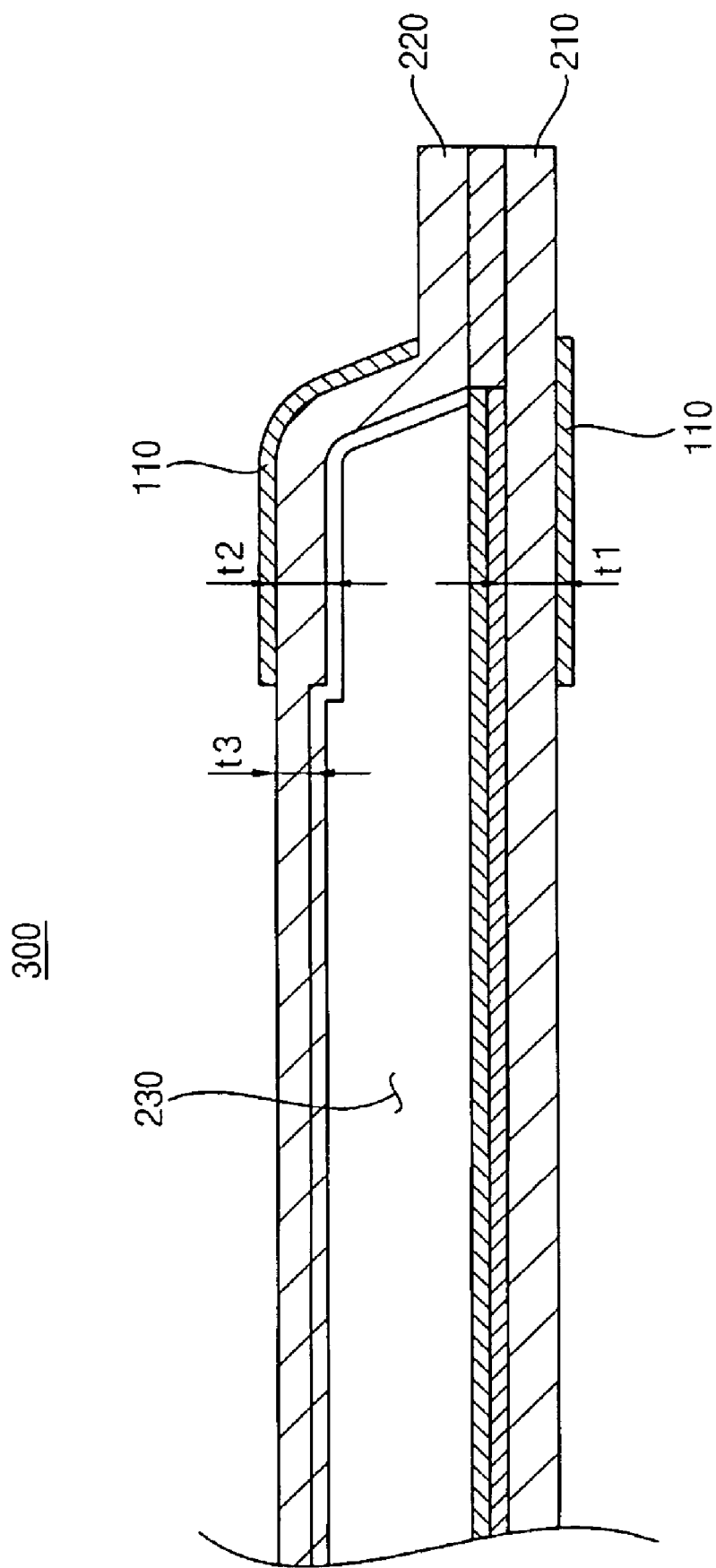
FIG. 4 is a partial cross-sectional view of another exemplary embodiment of a flat-type fluorescent lamp in accordance with the present invention.

FIG. 4 illustrates another exemplary embodiment of a flat-type fluorescent lamp 300 in accordance with the present invention. Referring to FIG. 4, flat-type fluorescent lamp 300 is identical to flat-type fluorescent lamp 100 of FIG. 1 except that the thickness of second substrate 220 varies from the portion where external electrodes 110 contact the second substrate 220 to the portion where external electrodes 110 do not contact the second substrate 220.

Like the embodiment of FIG. 3, in flat-type fluorescent lamp 300, first thickness t1 of first substrate 210 is similar to, or substantially the same as, second thickness t2 of second substrate 220 to a void a formation of pin-holes, because the current flowing to first and second substrates 210 and 220 depends on the thickness of first and second substrates 210 and 220 at the portions where external electrodes 110 contacts first and second substrates 210 and 220. The reduction of the second substrate thickness from second thickness t2 to a third thickness t3 can increase the light transmittance of lamp 300 and reduce the weight of lamp 300 without producing the pin-holes.

Figure 5:
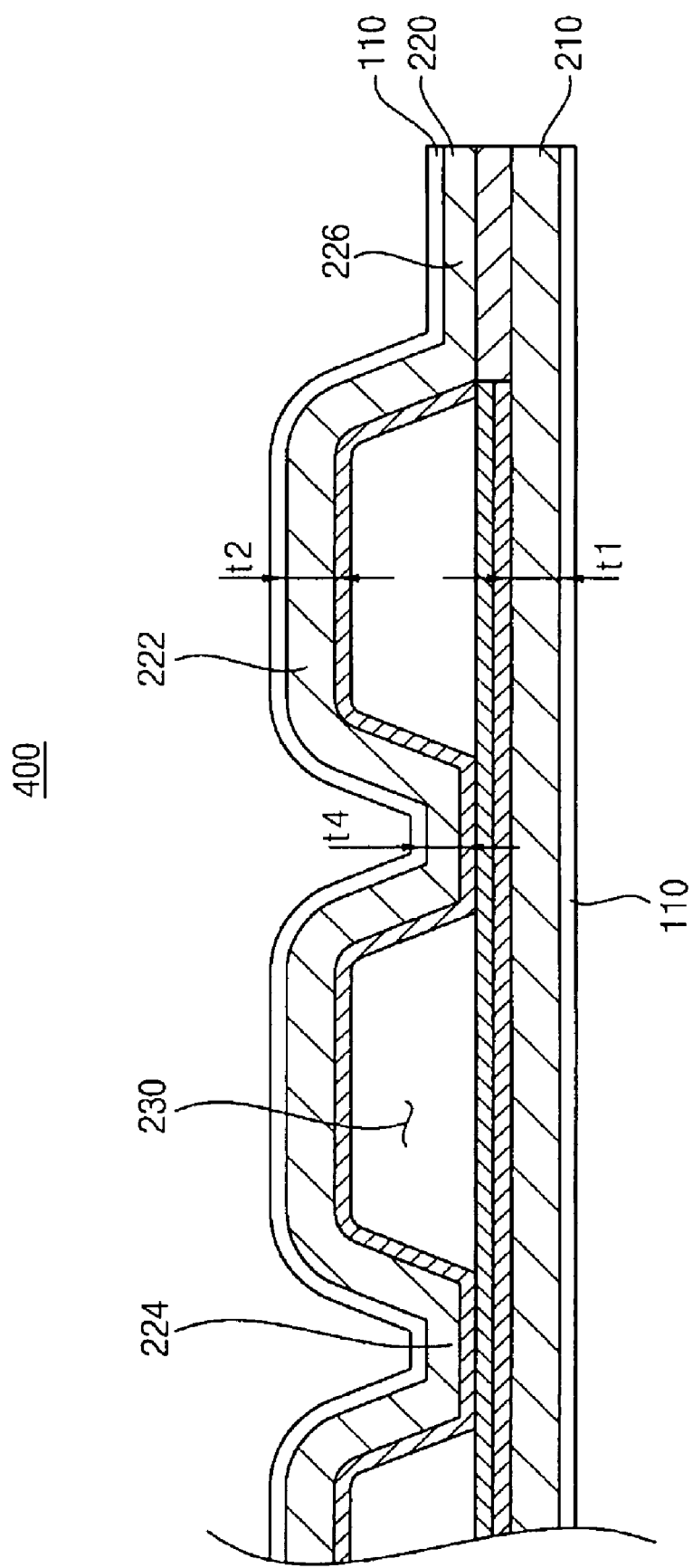
FIG. 5 is a partial cross-sectional view of still another exemplary embodiment of a flat-type fluorescent lamp in accordance with the present invention; and, FIG. 6 is a perspective view of an exemplary embodiment of a liquid crystal display in accordance with the present invention.

FIG. 5 illustrates still another exemplary embodiment of a flat-type fluorescent lamp 400 in accordance with the present invention. Referring to FIG. 5, flat-type fluorescent lamp 400 is identical to flat-type fluorescent lamp 100 of FIG. 1 except that the thickness of splitting portions 224 of second substrate 220 is different from the thickness of the other portions of second substrate 220. Like the embodiment of FIG. 3, in flat-type fluorescent lamp 400, first thickness t1 of first substrate 210 is similar to second thickness t2 of second substrate 220 to avoid a formation of the pin-holes. A fourth thickness t4 of second substrate 220 at splitting portions 224 can be bigger or smaller than thickness t2. When thickness t4 is smaller than thickness t2, the total weight of lamp 400 reduces. On the other hand, when thickness t4 is bigger than thickness t2, lamp 400 becomes more resistant to external impact. Thus, a thickness t4 of second substrate 220 at splitting portions 224 can be selectively chosen depending on intended application and desired features.

In another exemplary embodiment of the present invention, both thickness t3 of FIG. 4 and thickness t4 of FIG. 5 are applied to a flat-type fluorescent lamp.

Figure 6:
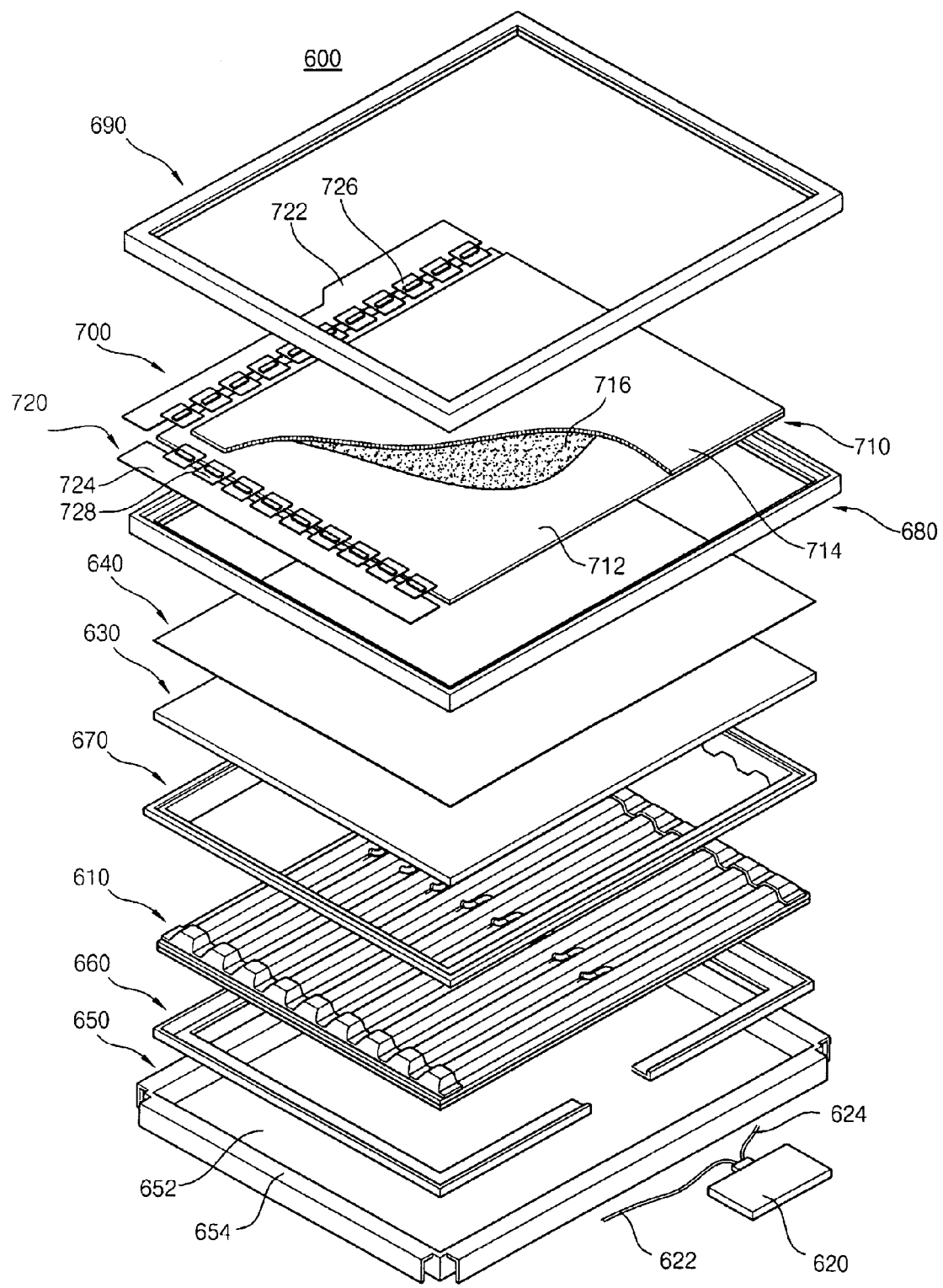

FIG. 6 illustrates an exemplary embodiment of an LCD 600 according to the present invention.

Referring to FIG. 6, LCD 600 includes a flat-type fluorescent lamp 610, an inverter 620, and a display unit 700. Flat-type fluorescent lamp 610 radiates visible rays in response to the electric signal from inverter 620. Exemplary embodiments of flat-type fluorescent lamps usable for flat-type fluorescent lamp 610 have been described with reference to FIGS. 1 to 5. Accordingly, a detailed description of flat-type fluorescent lamp 610 is omitted. Inverter 620 transmits an alternating current to flat-type fluorescent lamp 610 through a first and a second wire 622 and 624.

Display unit 700 includes a liquid crystal panel 710 that displays images and a driving circuit portion 720 which provides signals to liquid crystal panel 710.

Liquid crystal panel 710 includes a pair of glass substrates 712 and 714 and a liquid crystal layer 716 therebetween. Substrate 712 contains a number of thin film transistors ("TFTs") and pixel electrodes in a matrix form, and may therefore be termed a lower or TFT substrate. Each of the TFTs has a source connected to a data line, a gate connected to a gate line, and a drain connected to a pixel electrode. Substrate 714 contains a number of red, green and blue ("RGB") color filters with a transparent conductive common electrode on them, and therefore substrate 714 may be termed an upper or color filter substrate.

When a power is applied to the gate of the TFT and the TFT is turned on, an electric field is generated between the pixel electrode and the common electrode. The electric field varies an aligning angle of the liquid crystal molecules within the liquid crystal layer 716 interposed between the first substrate 712 and the second substrate 714. Thus, a light transmittance of the liquid crystal layer 716 is varied in accordance with the variation of the aligning angle of the liquid crystal, so a desired image may be obtained.

Driving circuit portion 720 includes a first printed circuit board ("PCB") 722 for supplying data signals to liquid crystal panel 710 via a plurality of data lines extending within the substrate 712, a second PCB 724 for supplying gate signals to the liquid crystal panel 710 via a plurality of gate lines extending within the substrate 712, substantially perpendicular to the data lines, a first flexible film 726 connecting first PCB 722 to liquid crystal panel 710, and a second flexible film 728 connecting second PCB 724 to liquid crystal panel 710.

LCD 600 further includes a diffuser 630 and an optical sheet 640. Diffuser 630 is disposed above flat-type fluorescent lamp 610 for luminance uniformity by diffusing light from flat-type fluorescent lamp 610. Diffuser 630 may be made of poly methyl methacrylate ("PMMA"). Optical sheet 640 is for enhancing luminance characteristics such as brightness and uniformity.

Additionally, LCD 600 includes a container 650 for receiving flat-type fluorescent lamp 610 with a bottom surface 652 and lateral surfaces 654 extended from bottom surface 652 to provide a receiving space. The lateral surfaces 654 may be bent over two times in order to provide coupling space and coupling strength for other elements (not shown) of the LCD 600. The lateral surfaces 654 may have an upside down U-shape as shown. Container 650 may be made of a metal having a superior strength to avoid deformation thereof.

LCD 600 may also include a shock absorbing buffer member 660 interposed between container 650 and flat-type fluorescent lamp 610 for supporting flat-type fluorescent lamp 610. Buffer member 660 is disposed at the edge portions of flat-type fluorescent lamp 610 for allowing a gap between flat-type fluorescent lamp 610 and container 650 such that the flat-type fluorescent lamp 610 is not electrically connected to the container 650. Further, buffer member 660 is made of an insulating material in order to electrically insulate the flat-type fluorescent lamp 610 from the container 650. Buffer member 660 can be made of silicon or other elastic material to absorb an impact externally applied to the flat-type fluorescent lamp 610. In the illustrated embodiment, the buffer member 660 includes two pieces, each having a substantially U-shaped shape. However, the buffer member 660 may instead include four pieces corresponding to sides or corners of the flat-type fluorescent lamp 610, respectively. The pieces of the buffer member 660 may instead be integrally formed into one piece.

LCD 600 may have a first mold frame 670 interposed between flat-type fluorescent lamp 610 and diffuser 630. First mold frame 670 secures flat-type fluorescent lamp 610 and diffuser 630 at the edges of mold frame 670. As shown in FIG. 6, mold frame 670 can have a closed shape. Alternatively, mold frame 670 may have two pieces, each having a substantially U-shaped shape or a substantially L-shaped shape, or four pieces corresponding to sides or corners of the flat-type fluorescent lamp 610, respectively.

LCD 600 may further include a second mold frame 680 disposed between optical sheet 640 and liquid crystal panel 710 for fastening and fixing optical sheet 640 and liquid crystal panel 710. Second mold frame 680 may have a similar shape with first mold frame 670.

Finally, LCD 600 has a top chassis 690 covering and enclosing display unit 700. In combination with container 650, top chassis 690 fixes the edge portions of liquid crystal panel 710. Top chassis 690 is made of metal or other suitable material.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A flat-type fluorescent lamp, comprising:
a first substrate having a first thickness;
a second substrate having a second thickness, wherein the second substrate and the first substrate are combined to form a discharging space;
a plasma gas filled in the discharging space; and
a pair of external electrodes disposed at end portions of the first substrate and the second substrate, wherein, at an area where the external electrodes are disposed, the first thickness is substantially same as the second thickness;
wherein the second substrate has the second thickness where the external electrodes are disposed, and the second thickness is substantially thicker than a third thickness of the second substrate where the discharging space is formed.

2. The flat-type fluorescent lamp of claim 1, wherein the second substrate further comprises a splitting portion which divides the discharging space by contacting the first substrate.

3. The flat-type fluorescent lamp of claim 2, wherein a first portion of the second substrate, which corresponds to the discharging space, has a thickness that is different from that of a second portion of the second substrate, which corresponds to the splitting portion.

4. The flat-type fluorescent lamp of claim 1, wherein the first thickness and the second thickness are no less than 0.7 mm and no more than 1.1 mm.

5. The flat-type fluorescent lamp of claim 1, wherein a light exiting surface of the second substrate has the third thickness.

6. The flat-type fluorescent lamp of claim 1, wherein the first substrate comprises a first fluorescent layer facing the second substrate, and the second substrate comprises a second fluorescent layer facing the first substrate.

7. The flat-type fluorescent lamp of claim 6, wherein the first thickness includes a thickness of the first fluorescent layer, and the second thickness includes a thickness of the second fluorescent layer.

8. The flat-type fluorescent lamp of claim 6, wherein a reflection layer is formed under at least one of the first fluorescent layer and the second fluorescent layer.

9. The flat-type fluorescent lamp of claim 8, wherein a thickness of the reflection layer contributes to the thickness of the first substrate or the second substrate where the reflection layer is formed.

10. The flat-type fluorescent lamp of claim 1, wherein one of the external electrodes is internalized.

11. A liquid crystal display, comprising:
a liquid crystal panel including liquid crystal molecules;
a flat-type fluorescent lamp comprising a lamp body having a first substrate and second substrate, the second substrate structured to form a discharge space in combination with the first substrate, and a pair of external electrodes covering end portions of the first substrate and the second substrate, wherein a thickness of the first substrate is substantially same as a thickness of the second substrate where the external electrodes are disposed;
an inverter connected to the external electrodes of the lamp body so as to supply discharge electricity to the lamp body of the flat-type fluorescent lamp;
a container that receives the flat-type fluorescent lamp; and
a top chassis that encloses the liquid crystal panel and the flat-type fluorescent lamp;

wherein the thickness of the second substrate where the external electrodes are disposed is substantially thicker than a thickness of the second substrate where the discharging space is formed.

12. The liquid crystal display of claim 11, wherein the discharge electricity is evenly distributed between the first and second substrates.

13. The liquid crystal display of claim 11, wherein the second substrate further comprises a splitting portion, which divides the discharging space by contacting the first substrate.

14. The liquid crystal display panel of claim 13, wherein a thickness of the second substrate where the discharging space is formed is substantially different from a thickness of the second substrate where the splitting portion is formed.

15. The liquid crystal display of claim 11 wherein the first substrate and the second substrate are no less than 0.7 mm and no more than 1.1 mm thick.

16. The liquid crystal display of claim 11, wherein the thickness of the second substrate where the discharging space is formed corresponds to a light exiting surface of the second substrate.

17. The liquid crystal display of claim 11, wherein the first substrate comprises a first fluorescent layer facing the second substrate, and the second substrate comprises a second fluorescent layer facing the first substrate.

18. The liquid crystal display of claim 17, wherein a thickness of the first fluorescent layer contributes to the thickness of the first substrate, and a thickness of the second fluorescent layer contributes to the thickness of the second substrate.

19. The liquid crystal display of claim 17, wherein a reflection layer is formed under at least one of the first fluorescent layer and the second fluorescent layer.

20. The liquid crystal display of claim 19, wherein a thickness of the reflection layer contributes to the thickness of the first substrate or the second substrate where the reflection layer is formed.

21. A method of minimizing pin-holes in a lamp body of a flat-type fluorescent lamp from occurring upon application of a voltage supplied to external electrodes on the lamp body, the method comprising:
 providing a first substrate having a first thickness in an area where external electrodes are to be disposed;
 providing a second substrate having a second thickness in an area where external electrodes are to be disposed; and,
 selecting the first thickness to be substantially same as the second thickness
 providing the second substrate with a third thickness in an area where light exits from the lamp body; and
 selecting the third thickness to be substantially thinner than the second thickness.

22. The method of claim 21, further comprising providing the second substrate with a plurality of discharging space portions and a plurality of splitting portions separating adjacent discharging space portions from each other, and selecting a fourth thickness of the splitting portions to be different from the second thickness.

23. The method of claim 21, wherein providing a second substrate having a second thickness includes selecting a plate having an original thickness greater than the second thickness, and shaping the plate to form the second substrate having the second thickness.

24. The method of claim 21, further comprising providing external electrodes on the first substrate and the second substrate within areas having the first thickness and the second thickness, respectively.

* * * * *